US009063576B1

(12) United States Patent
Kaufman et al.

(10) Patent No.: US 9,063,576 B1
(45) Date of Patent: Jun. 23, 2015

(54) MANAGING GESTURE INPUT INFORMATION

(71) Applicant: Amazon Technologies, Inc., Reno, NV (US)

(72) Inventors: Donald L. Kaufman, Kirkland, WA (US); Rexford Jay Tibbens, Bainbridge Island, WA (US); James Arthur Wilson, San Francisco, CA (US); Pirasenna Thiyagarajan, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 128 days.

(21) Appl. No.: 13/856,644

(22) Filed: Apr. 4, 2013

(51) Int. Cl.
*G06F 3/041* (2006.01)
*G06F 3/01* (2006.01)

(52) U.S. Cl.
CPC .................................. *G06F 3/017* (2013.01)

(58) Field of Classification Search
CPC . G06F 3/0488; G06F 3/04815; G06F 3/1423; G06F 3/1438; G06F 2300/02; G06F 2330/02; G06F 3/017; F06F 2360/127
USPC ........... 345/1.3, 156–184, 420, 633; 715/781, 715/863, 864; 706/17; 348/240.2, 47
See application file for complete search history.

(56) References Cited

U.S. PATENT DOCUMENTS

| 8,261,212 | B2 * | 9/2012 | Wigdor et al. ................. 715/863 |
| 8,836,768 | B1 * | 9/2014 | Rafii et al. ....................... 348/47 |
| 2003/0028498 | A1 * | 2/2003 | Hayes-Roth ..................... 706/17 |
| 2009/0217211 | A1 * | 8/2009 | Hildreth et al. ................ 715/863 |
| 2010/0194687 | A1 * | 8/2010 | Corson et al. .................. 345/158 |
| 2011/0035698 | A1 * | 2/2011 | Tanaka ........................... 715/781 |
| 2011/0173204 | A1 * | 7/2011 | Murillo et al. ................ 707/741 |
| 2011/0181526 | A1 * | 7/2011 | Shaffer et al. ................. 345/173 |
| 2011/0205163 | A1 * | 8/2011 | Hinckley et al. .............. 345/173 |
| 2011/0260829 | A1 * | 10/2011 | Lee ............................... 340/5.51 |
| 2011/0283231 | A1 * | 11/2011 | Richstein et al. ............. 715/810 |
| 2012/0038582 | A1 * | 2/2012 | Grant ............................ 345/174 |
| 2012/0081317 | A1 * | 4/2012 | Sirpal et al. ................... 345/173 |
| 2012/0092277 | A1 * | 4/2012 | Momchilov ................... 345/173 |
| 2012/0206331 | A1 * | 8/2012 | Gandhi .......................... 345/156 |
| 2012/0242603 | A1 * | 9/2012 | Engelhardt et al. ........... 345/173 |
| 2012/0274541 | A1 * | 11/2012 | Inami et al. .................... 345/1.3 |

(Continued)

OTHER PUBLICATIONS

Using gestures on a Veer, Pre 3, Pre 2, Pre. [online] Palm, Inc., 2013 [retrieved on Apr. 3, 2013]. Retrieved from the Internet: <URL: http://kb.hpwebos.com/wps/portal/kb/na/pre/p100eww/sprint/solutions/article/13171_en.html#N1012C >.

(Continued)

*Primary Examiner* — Prabodh M Dharia
(74) *Attorney, Agent, or Firm* — Kilpatrick Townsend & Stockton LLP

(57) ABSTRACT

Techniques for managing screen input information associated with configurable gestures may be provided. For example, configuration information associated with a performable gesture may be received. In some examples, the configuration information may be received by an operating system service of a device. Additionally, in some examples, information associated with input detected by the device may be received by the operating system service. Further, in some examples, an operation of the device may be performed when the information associated with the input identifies performance of the performable gesture.

26 Claims, 9 Drawing Sheets

(56) References Cited

U.S. PATENT DOCUMENTS

| | | | |
|---|---|---|---|
| 2013/0222272 A1* | 8/2013 | Martin, Jr. | 345/173 |
| 2013/0286435 A1* | 10/2013 | Anezaki et al. | 358/1.15 |
| 2014/0040835 A1* | 2/2014 | Hildreth et al. | 715/863 |
| 2014/0071078 A1* | 3/2014 | Hayton | 345/173 |
| 2014/0139422 A1* | 5/2014 | Mistry et al. | 345/156 |
| 2014/0143683 A1* | 5/2014 | Underwood et al. | 715/752 |
| 2014/0155162 A1* | 6/2014 | Mattice et al. | 463/31 |
| 2014/0204247 A1* | 7/2014 | Bilgen et al. | 348/240.2 |
| 2014/0282283 A1* | 9/2014 | Glebocki | 715/863 |

OTHER PUBLICATIONS

Palm TX. [online]. Palm, Inc., 2013 [retrieved on Apr. 3, 2013] Retrieved from the Internet: <URL: http://kb.hpwebos.com/wps/portal/kb/na/tungsten/tx/unlocked/solutions/article/8366_en.html>.

* cited by examiner

MANAGING GESTURE INPUT INFORMATION

BACKGROUND

As mobile devices become more widespread and advanced, more and more users turn to them for enabling a multitude of different functions, features, and/or software applications. For example, mobile devices have become both location and context aware. Thus, they may be configured to detect a geographic location as well as other pertinent contextual information that may aid in the software application functionality being implemented. Additionally, as more and more features are enabled, consumers and developers alike are hoping that mobile devices may supplant desktop and/or laptop computers or at least be comparable from a feature availability standpoint. However, many mobile devices still face challenges that keep them from rivaling more standard desktop and/or laptop computing systems, at least in part because non-mobile devices tend to be configured with one or more peripheral devices that mobile devices lack. As such, managing screen input information as well other data that may generally be provided by desktop and/or laptop peripherals may pose challenges to the user device consumers as well as the developers.

BRIEF DESCRIPTION OF THE DRAWINGS

Various embodiments in accordance with the present disclosure will be described with reference to the drawings, in which.

DETAILED DESCRIPTION

Figure 1:
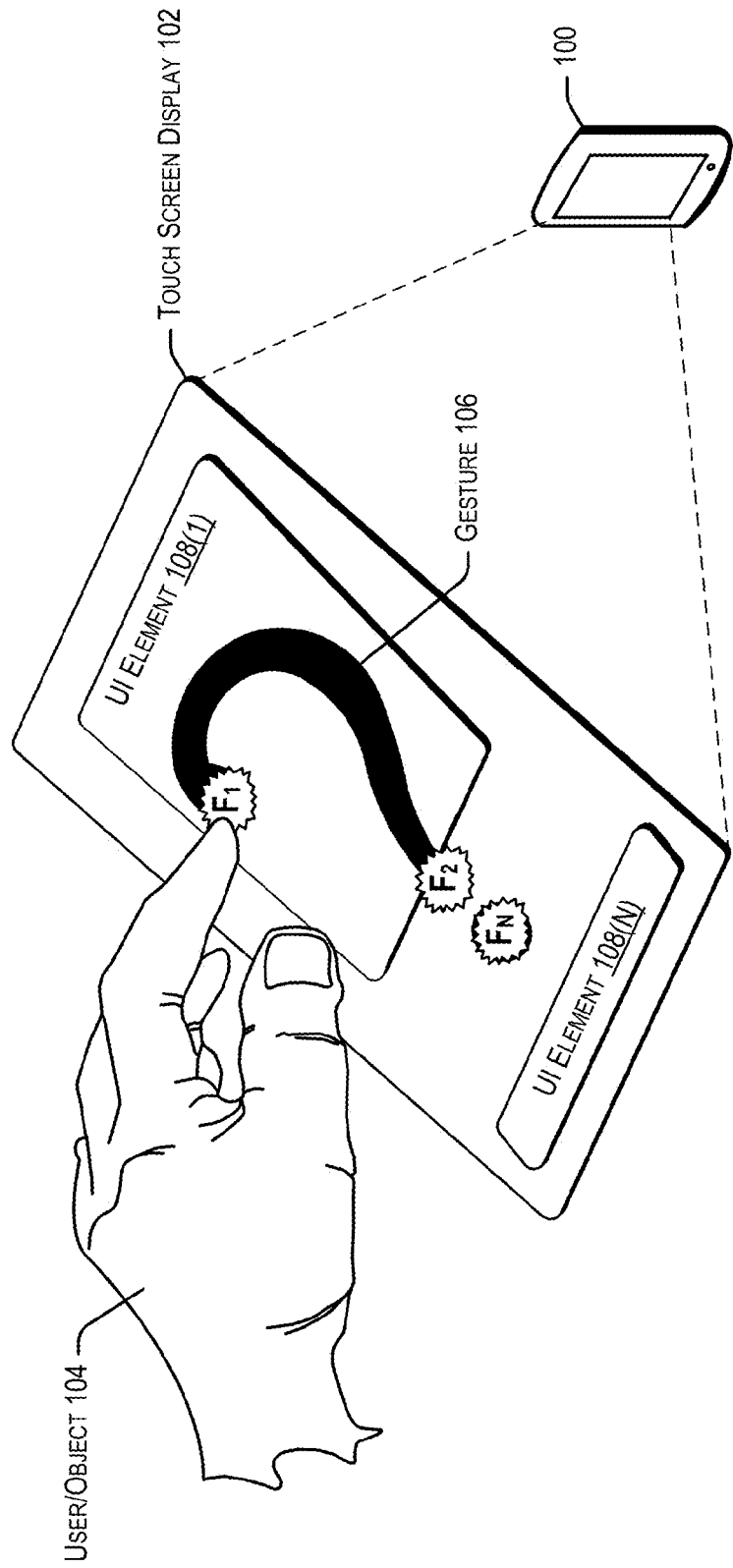
FIG. 1 illustrates an example block diagram for describing the management of screen input information described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing device input information. In some examples, device input information may be identified as a gesture performed on a screen or other surface of a device (e.g., any touch-sensitive or touch-capable surface). The device may include a screen (e.g., a touch screen), and the gesture may be detected by the screen. However, in other examples, the gesture may be detected without contact being made with the device or by a surface of the device other than the screen. In some examples, utilizing gestures on a device may enable the freeing up of screen real estate, and reducing clutter on the screen. Additionally, a performable gesture may include any gesture that the device is configured to detect. Once performed, the performable gesture may be described as a performed gesture. Further, in some examples, any number of performable gestures may be created, defined, configured, and/or deleted. For example, a collection or list of performable gestures may be defined and/or registered with an operating system including, but not limited to, a question mark gesture, one or more swipes (e.g., in any direction or combination of directions), a letter shape, a geometric shape, etc. In some examples the performable gesture may be performed by a user or an object (e.g., a hand or finger, a stylus, or any other object accessible by a user to perform the performable gestures). Gestures may be performed with one or more objects (e.g., two fingers may indicate a "pause" operation and/or one or more separation motions (e.g., a "question mark" may be drawn by a curved line followed by a single contact with the screen). Further, gestures may be defined that associate symbols that don't generally have known meanings with operations (e.g., a "curly" shape may open a gaming application associated with "pigs" or the like).

In some examples, gestures may be assigned to or otherwise associated with one or more global operations (e.g., an operation performed by an operating system (OS) of the device or an operation that otherwise performs a function or action independent of particular software applications (e.g., a web browser, a media content player, a mapping application, etc.). Yet, in other examples, the gestures may be assigned to or otherwise associated with one or more application-specific functions or actions. Global operations may include, but are not limited to, opening a help file (or other file of the device), launching a software application, closing a software application, searching the device for documents and/or applications, or other device operations may be independent of any particular functionality of an application. Alternatively, or in addition, application-specific operations may include, but are not limited to, navigating from one page of an application to another (e.g., within a web browser or reading application), playing a media file, pausing a media file, skipping within tracks of media, navigating through selections or other operations that may be more specific to an application. Further, in some examples, the utilization of the performable and/or configurable gestures may enable the operating system and/or software applications to free up screen real estate of the device by reducing the screen space used for certain buttons, icons, and/or links. In other words, the buttons, icons, and/or links of a device's screens may effectively be replaced by one or more gestures.

Additionally, in some examples, an application may register one or more performable gestures with an OS service (e.g., an interruption handler or other service configured to receive user input and provide information to the applications in response to the input). In this way, a registry file may be built, updated, or otherwise modified to include a list, set, or other grouping of performable gestures appropriate for each application. The registry (also referred to as registration) information may associate certain performable gestures with certain operations and/or actions that the applications may be configured to perform. In this way, each application may define its own set of gestures that it is configured to understand. Additionally, the applications may provide configurable gesture information (e.g., registration information that indicates that the gesture may be configured by a user and/or by the OS) for the registry. As such, the configurable gesture information may indicate one or more operations that can be performed based on a user-generated or user-configured gesture. For example, a podcast application may provide configurable gesture information for one or more of the user interface (UI) elements of the podcast application. Once configured for utilization, the OS and/or the application may remove the UI elements from the UI, thus, freeing up screen real estate of the podcast application for other information and/or elements. As used herein, a UI element may include any item, picture, icon, link, or other button of a UI that may be selected or otherwise activated by a user to perform or request an action be performed by the application and/or device.

Further, global gestures may also be configured by a user of a device. As such, a user may be able to set or update one or more gestures to perform one or more global operations. In some examples, a user may assign a particular gesture (e.g., drawing an "e" or "E" on the screen) to a particular operation (e.g., opening an electronic mail (email) application). Alternatively, or in addition, a user may assign other gestures to the same operation (e.g., all of "e," "E," and/or "□" gestures may be assigned to opening an email application. Additionally, a gesture may be made up of a single motion or a combination of motions (e.g., as noted above, a "?" gesture may be performed by drawing the curved portion alone or by drawing the curved portion followed by drawing the associated period). Additionally, in some examples, as described briefly above, a handler or other OS service may be configured to receive and/or identify the performed gestures while an application is running, as well as make appropriate determinations and/or provide appropriate information in the background. Further, in some examples, changes to a UI may be made automatically and/or dynamically by the OS and/or the application based at least in part on configurations and/or changes made to the registration information and/or the configurable gesture information.

FIG. 1 depicts an illustrative user device 100 such as, but not limited to, a mobile phone, a tablet, an e-book reader, an mp3 player, a remote control, or any other computing device that may be configured to implement the techniques described herein. For example, the user device 100 may be configured to manage screen input information including, but not limited to, motion, heat, conduction, etc., either external to a touch screen display 102 (e.g., independent of contact with the touch screen display 102), internal to the device 100 (e.g., based at least in part on a button or other actuator being pushed to complete an electrical circuit within the housing of the device 100), and/or directly on the touch screen display 102 (e.g., via the common method of selecting GUI icons on a display screen). As such, the input information may be any type of data collected by a sensor of the device 100 and stored, processed, or otherwise managed by the device 100 or a web service, web site, and/or other network resource in communication with the device 100 (e.g., via a wired or wireless network). As shown in FIG. 1, in some examples, the device 100 may include the touch screen display 102. Motion or presence of an object 104 (e.g., a finger of a user) may be detected when the object comes into contact with the touch screen display 102, moves on the touch screen display 102, and/or pauses on the touch screen display 102. Speed and direction of an object may be detected by correlating relative contact between one or more different locations on the touch screen display 102. Multiple objects 104 (e.g., two or more fingers, etc.) may be detected as well. As such, a gesture may be configured as any combination of one or more contact points and/or one or more performed motions. As used herein, when a user performs a gesture 106, the gesture 106 and/or motion may be described as "drawn" (e.g., a user may "draw" a question mark shape as at least one example of a gesture).

As illustrated in FIG. 1, in some examples, the touch screen display 102 may be configured to provide, render, or otherwise display one or more UI elements 108(1)-(N) (e.g., a hyper link, an icon that represents a link to electronically stored content, a link or icon that represents content or an application local to the device 100, or the like). Alternatively, or in addition, the display 102 may be configured to provide a UI for a specific application or for the OS (e.g., a home screen or the like). For example, the display 102 may render a home screen of the user with icons or other UI elements that indicate software applications or widgets that may be activated by the user. Additionally, in some aspects, a user may perform the gesture 106 on the display 102. For example, the user may place his or her finger (or any other object 104) at a location F1 that corresponds to a first location on the display 102. The user may then draw a shape, letter, or other design (e.g., a manifestation of the gesture) on the display 102. For example, in FIG. 1, the user has drawn a question mark ("?") (e.g., with the period) by starting at location F1, drawing the shape (here, the question mark shape), and finishing the gesture 106 at either location F2 or location FN (e.g., by picking up the object 104 at F2, and tapping at FN).

In some examples, once a user has performed a gesture 106, the device 100 may be configured to perform one or more operations. An operation may include any combination of actions and/or instructions to be performed by one or more processors of the device 100 in conjunction with at least one or more storage locations of the device 100. Operations may include launching an application, opening a document, providing pass-through information to an application, or the like. For example, and without limitation, upon receipt of input information that indicates that the performed gesture 106 was the question mark shape (e.g., received by an OS handler and/or from the display 102), the device 100 may launch or otherwise open a global (otherwise referred to as "device-specific") help document, file, and/or application. In this way, the OS may be configured to interrupt whatever other operations are being performed and/or whatever UI elements 108 are being rendered to provide the help information. In some examples, the question mark may be assigned to the operation of providing the global help information regardless of the focus of the UI. For example, even if an application is open (e.g., a web browser), drawing the question mark gesture 106 may activate the global help information as opposed to application-specific help information. However, in other examples, the focus of the UI may control, where drawing the question mark gesture 106 while an application has the focus may activate application-specific help information. As desired, this may be configured by a user, the device, the application, and/or a software developer. As such, a user may have some control of the implementation of the gestures 106. Default operations and/or gesture-operation associations may also be provided.

Figure 2:
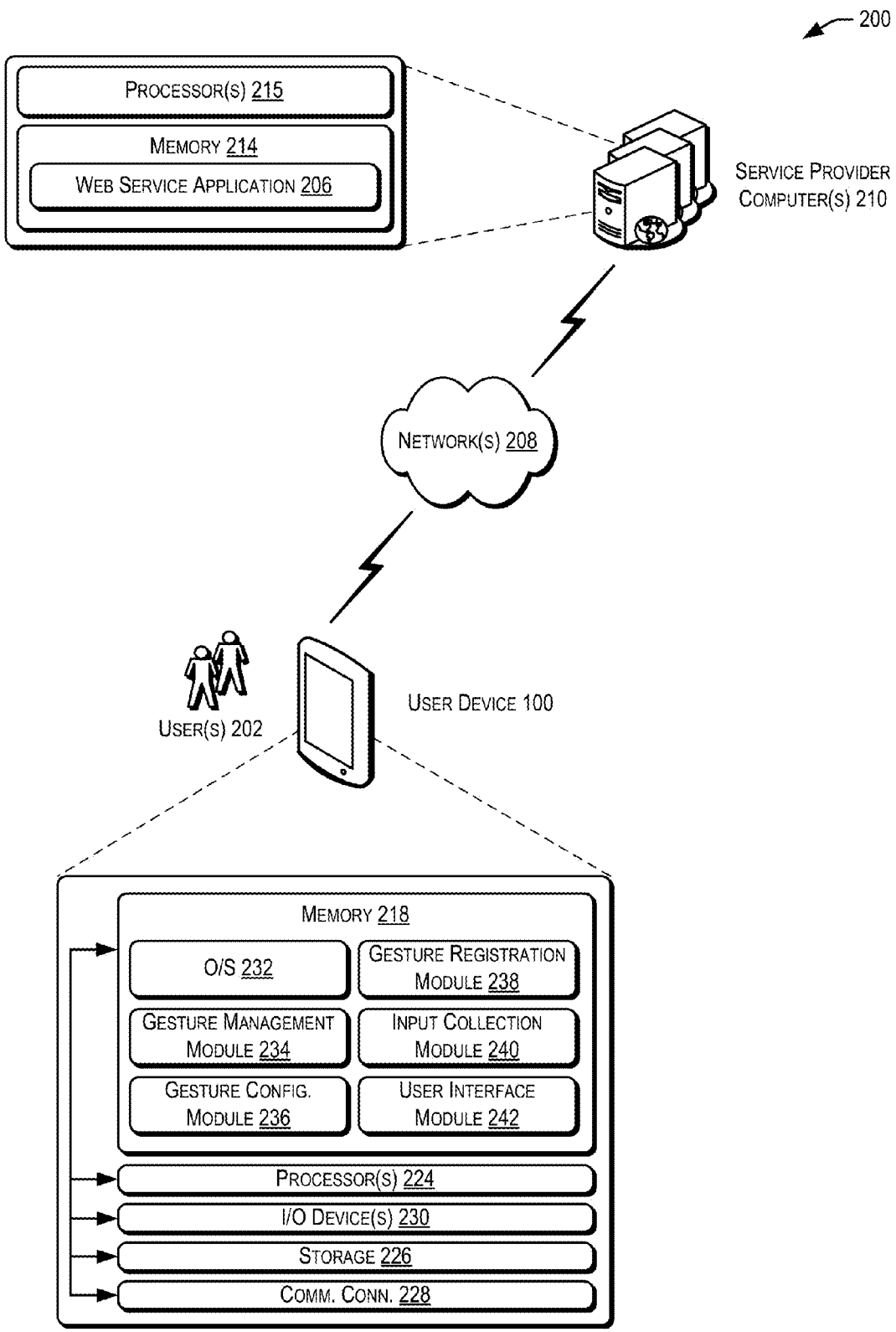
FIG. 2 illustrates an example architecture for implementing the management of screen input information described herein that includes at least one user device and/or one or more service provider computers connected via one or more networks, according to at least one example.

FIG. 2 depicts an illustrative system or architecture 200 in which techniques for managing screen input information may be implemented. In architecture 200, one or more users 202 (e.g., device owners, account holders, etc.) may utilize the user computing device 100 to access local applications (e.g., stored and/or executable by the user device 100), a web service application 206, a user account accessible through the web service application 206, or a web site or other network resource via one or more networks 208. In some aspects, the web service application 206, web site, and/or user account may be hosted, managed, and/or otherwise provided by a computing resources service or service provider, such as by utilizing one or more service provider computers 210. The one or more service provider computers 210 may, in some examples, provide computing resources such as, but not limited to, applications for purchase and/or download, web sites, web hosting, client entities, data storage, data access, management, virtualization, etc. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks, and other private and/or public networks. While the illustrated example represents the users 202 accessing the web service application 206 over the networks 208, the described techniques may equally apply in instances where the users 202 interact with a service provider computer 210 via the user device 100 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

As described briefly above, the web service application 206 may allow the users 202 to interact with a service provider computer 210, such as to store, access, and/or manage data, develop and/or deploy computer applications, and/or host web content. The one or more service provider computers 210, perhaps arranged in a cluster of servers or as a server farm, may host the web service application 206. These servers may be configured to host a website (or combination of websites) viewable via the user device 100 or a web browser accessible by a user 202. Other server architectures may also be used to host the web service application 206. The web service application 206 may be capable of handling requests from many users 202 and serving, in response, various user interfaces that can be rendered at the user device 100 such as, but not limited to, a web site. The web service application 206 can interact with any type of website that supports user interaction, including social networking sites, electronic retailers, informational sites, blog sites, search engine sites, news and entertainment sites, and so forth. As discussed above, the described techniques can similarly be implemented outside of the web service application 206, such as with other applications running on the user device 100.

The service provider computers 210 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 210 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the service provider computers 210 may be in communication with the user device 100 via the networks 208, or via other network connections. The service provider computers 210 may include one or more servers, perhaps arranged in a cluster, or as individual servers not associated with one another.

In one illustrative configuration, the service provider computers 210 may include at least one memory 214 and one or more processing units (or processor(s)) 215. The processor(s) 215 may be implemented as appropriate in hardware, computer-executable instructions, firmware, or combinations thereof. Computer-executable instruction or firmware implementations of the processor(s) 215 may include computer-executable or machine-executable instructions written in any suitable programming language to perform the various functions described.

The memory 214 may store program instructions that are loadable and executable on the processor(s) 215, as well as data generated during the execution of these programs. Depending on the configuration and type of service provider computers 210, the memory 214 may be volatile (such as random access memory (RAM)) and/or non-volatile (such as read-only memory (ROM), flash memory, etc.). The service provider computers 210 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM. Turning to the contents of the memory 214 in more detail, the memory 214 may include an operating system and one or more application programs or services for implementing the features disclosed herein including at least the web service application 206.

In some examples, the user device 100 may also be any type of computing device such as, but not limited to, an e-book reader, a mobile phone, a smart phone, a personal digital assistant (PDA), a laptop computer, a thin-client device, a tablet PC, etc. In some examples, the user device 100 may be in communication with the service provider computers 210 via the networks 208, or via other network connections.

In one illustrative configuration, the user device 100 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of user device 100, the memory 218 may be volatile (such as random access memory (RAM)) and/or non-volatile (such as read-only memory (ROM), flash memory, etc.). The user device 100 may also include additional storage 226, which may include removable storage and/or non-removable storage. The additional storage 226 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM), or ROM.

The memory 218 and the additional storage 226, both removable and non-removable, are examples of computer-readable storage media. For example, computer-readable storage media may include volatile or non-volatile, removable, or non-removable media implemented in any method or technology for storage of information such as computer-readable instructions, data structures, program modules, or other data. As used herein, modules may refer to programming modules executed by computing systems (e.g., processors) that are part of the user device 100 or the service provider computers 210. The memory 218 and the additional storage 226 are all examples of computer storage media. The user device 100 may also contain communications connection(s) 228 that allow the user device 100 to communicate with a stored database, another computing device or server, user terminals, and/or other devices on the networks 208. The user device 100 may also include input/output (I/O) device(s) and/or ports 230, such as for enabling connection with a keyboard, a mouse, a pen, a voice input device, a touch input device, a display, speakers, a printer, etc.

Turning to the contents of the memory 218 in more detail, the memory 218 may include an operating system 232 and the one or more application programs or services for implementing the features disclosed herein including a gesture management module 234, a gesture configuration module 236, an gesture registration module 238, an input collection module 240, and/or a user interface module 242. Additionally, in some examples, as noted above, the OS 232 may be configured with a handler (e.g., an event handler, an interrupt handler, or the like), for interrupting regular operations of the device 100 to perform alternative operations (e.g., launching a new application, overriding other operations, etc.). The handler may, in some examples, be configured to receive the gesture information (e.g., from the gesture management module 234 and/or the input collection module 240) and perform one or more operations (e.g., at the OS level) based at least in part on the received gesture information. Additionally, in some examples, the handler may be configured to execute or otherwise manage one or more (or various combinations) of the modules 234, 236, 238, 240, 242, as appropriate. The gesture management module 234 may be configured to manage the one or more gestures. For example, both configurable gestures and default gestures may be associated or otherwise linked with one or more operations to be performed. The associations between gestures and operations may, in some aspects, be stored in one or more storage locations such as, but not limited to, the memory 218, a database, or other storage location of the device (or remote location). As such, the gesture management module 234 may be configured to store the associations and/or retrieve operations based at least in part on identified gestures (e.g., that have been performed). Further, in some examples, when a gesture is configured (e.g., by a user), the gesture management module 234 may be responsible for updating or otherwise modifying the gesture-operation association information.

In some aspects, the gesture configuration module 236 may be configured to manage or otherwise provide gesture configuration capabilities associated with the device. As noted above, both global and application-specific gestures may be configured, reconfigured, and/or default associations may be accepted. As such, the gesture configuration module 236 may be configured to provide a configuration UI for enabling users 202 to create new gesture definitions, modify current gesture definitions, and/or accept default the gesture definitions. As used herein, a gesture definition may include a gesture (e.g., any combination of contacts or motions on the screen of the device 100), an associated operation (e.g., launch application, open help document, skip to the next song, etc.), and/or an indication of whether the gesture is global or application specific. Additionally, in some examples, the gesture configuration module 236 may be configured to provide two different configuration UIs, one within the OS settings and one within the application settings of each applications. However, in some examples, even the application-specific gesture configurations may be configured via the OS settings UI.

In some examples, the gesture registration module 238 may be configured to enable applications of the device 100 to register default, locked, and/or configurable gestures to be associated with the application. In some examples, the registration step may be part of installing the application on the device 100 (e.g., installing the application with the OS 232). Additionally, in some examples, a default gesture may include any gestures that are provided by the application with default definitions or associations. These default gestures may be locked or configurable. Locked gestures, in some examples, may include gestures that cannot be configured or otherwise changed by a user or other entity. Alternatively, configurable gestures may be changed, updated, modified, or otherwise configured by others. Further, in some examples, an application may register one or more blank gestures that can be fully configured by a user without having started as a default. For example, a default gesture that is configurable may include a swipe forwards gesture of a media player that is configurable such that a user 202 may change the operation from skip forwards to fast forward. Alternatively, a blank gesture may enable the user to define an entirely new gesture (e.g., a shape or motion that is not already assigned to any operation), and then provide an operation assignment for that gesture.

Additionally, in some aspects, the input collection module 240 may be configured to receive input (e.g., performed gestures) from the display device or other input area of the device (e.g., a gesture area may be defined that is separate from the display device). The input collection module 240 may also be configured to provide the performed gesture information (e.g., including location information, speed information, number of contact points, etc.) to the gesture management module 234 and/or the handler of the OS 232. Further, in some examples, the user interface module 242 may be configured to provide the UI and/or UI elements (including links, icons, applications, buttons, etc.). In some examples, the user interface module 242 may also be configured to indicate via a UI notification that a performed gesture was received, accepted, or denied. Further, in some examples, the user interface module 242 may be configured to automatically modify UI elements of the device such that elements may be removed (e.g., freeing up screen real estate) once a gesture has been defined and/or configured to activate the same operation associated with the elements being removed.

Additional types of computer storage media that may be present in the user device 100 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the user device 100. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

A few additional examples of the operations of the user device 100 are also described in greater detail below with reference to at least FIGS. 3-9.

Figure 3:
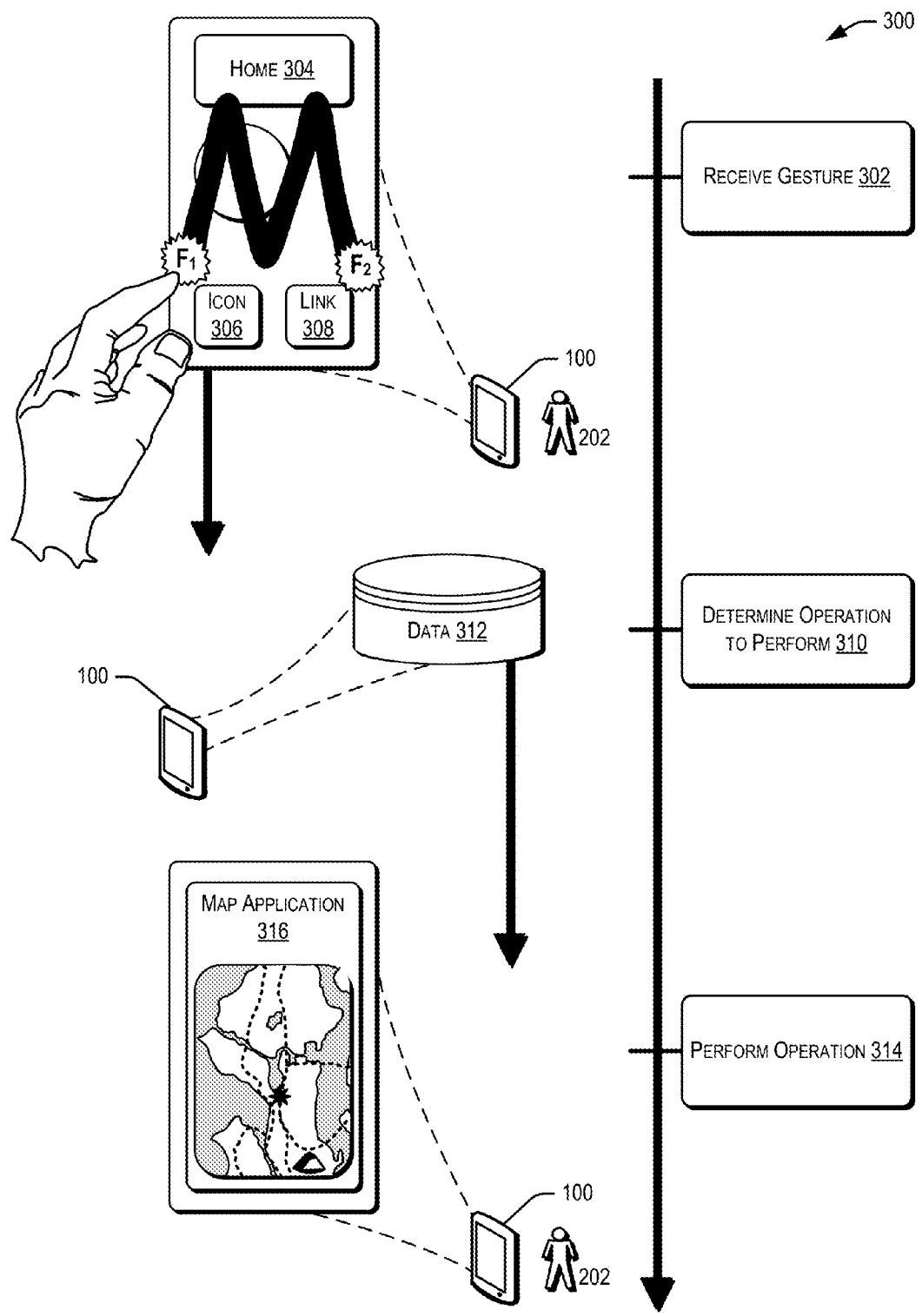
FIG. 3 illustrates an example flow diagram for describing the management of screen input information described herein, according to at least one example.

FIG. 3 depicts an illustrative flow 300 with which techniques for managing screen input information may be described. In illustrative flow 300, operations may be performed by one or more processors 224 of the device 100 described with reference to at least FIGS. 1 and 2. Additionally, instructions for performing the operations may be stored in one or more memories 218 of the device 100. As desired, the flow 300 may begin at 302, where the device 100 may receive a gesture (e.g., performed on the display screen 102) from a user 202. In at least one non-limiting example, the user 202 may perform a gesture in the shape of the letter "M" by at least starting the gesture at F1 and ending at or near F2. As shown in FIG. 3, the UI of the device 100 is displaying a home screen 304 that may include one or more images, icons 206, and/or links 308. As desired, and as described above, any type of shape may be gestured or drawn on the device 100 to activate one or more operations of the device 100. Here, the example illustrates some details associated with performing an "M" gesture; however, any number and/or type of other gesture-operation combinations are envisioned and should be understood by one skilled in the art.

In some examples, at 310 of the flow 300, the device 100 may determine an appropriate operation to be performed based at least in part on received gesture. For example, the device 100 may retrieve gesture information from a storage device 312 and/or query a database. The storage device 312 or database may be local to the device 100 or may be accessible via one or more networks as described above (e.g., hosted by the service provider computers 210 of FIG. 2. As such, determining an appropriate operation to be performed may include looking up gesture-operation combinations, associations, and/or definitions. Additionally, determining the appropriate operation to be performed may also include performing logic, analyzing configuration information, and/or determining whether the operation is to be performed by the OS (e.g., when the operation is a global operation) or by the application (e.g., when the operation is an application-specific operation). Further, in some examples, at 314 of the flow 300, the device 100 may perform the operation. As noted, in some examples, the operation may include providing (e.g., passing through) information to an application that enables the application to perform the appropriate operation (e.g., when the operation is application-specific). However, in the specific, non-limiting example of FIG. 3, the device 100 is configured to launch a map application 316 in response to the "M" gesture. As noted above, this may be a default gesture of the OS, it may be a locked gesture (such that it cannot be changed), and/or it may be a configured gesture (e.g., the user 202 may have configured the "M" gesture to launch the map application 316 or the user 202 may have recorded the "M" gesture and then assigned to that gesture an operation that launches the map application 316). For illustrative purposes, this may be an example of a global gesture, as the OS would likely launch the map application 316, as opposed to another application launching the map application 316.

Figure 4:
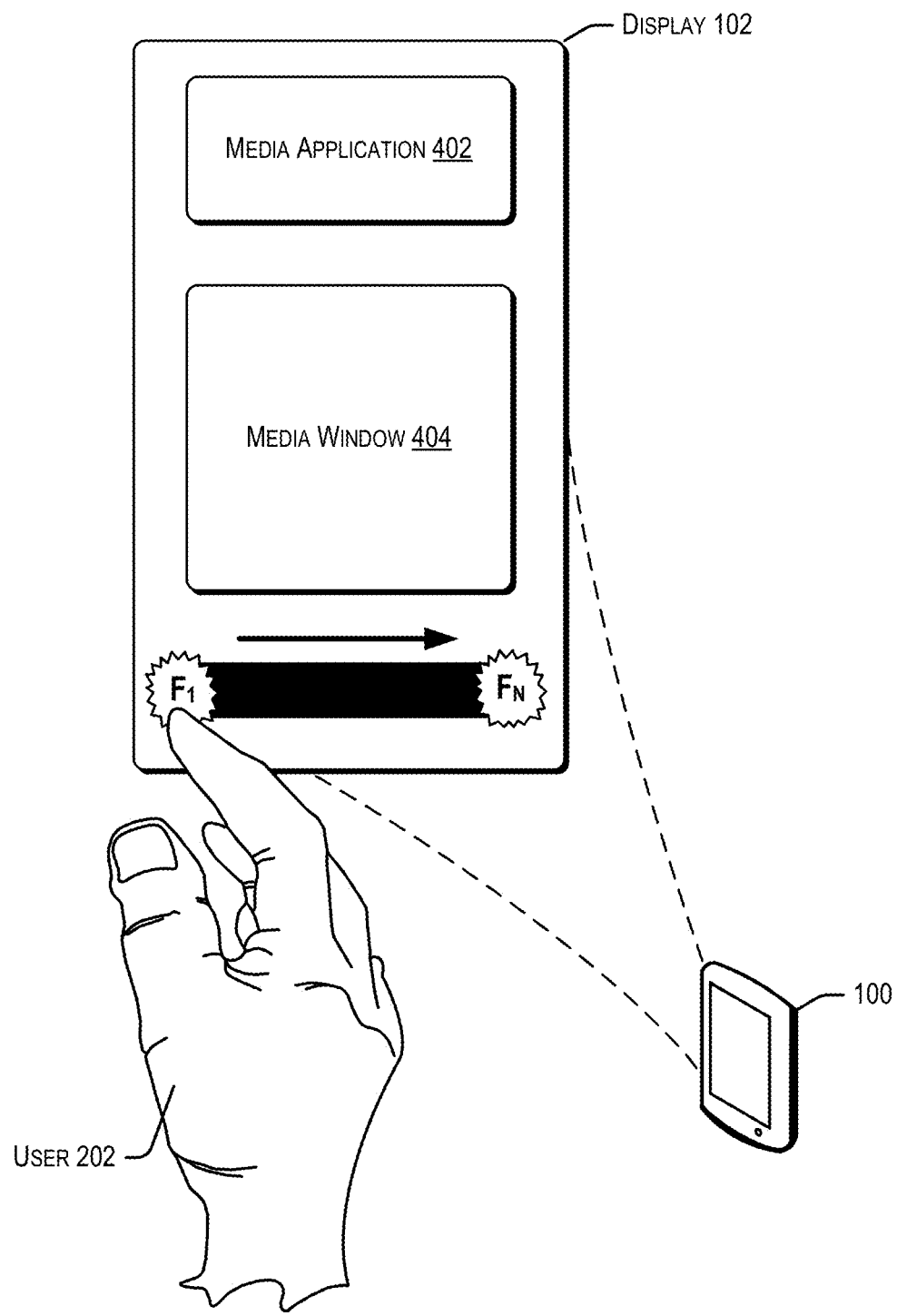
FIG. 4 illustrates an example block diagram for describing the management of screen input information described herein, according to at least one example.

FIG. 4 depicts an example block diagram 400 for describing additional techniques and/or features for managing screen input information, as described herein. In some examples, as discussed above, the display 102 of the device may be configured to render a UI associated with one or more applications including, but not limited to, a media application 402 (e.g., configured to play music, videos, podcasts, or the like), a web browser, a map application (e.g., the map application 308 of FIG. 3), a home screen (e.g., the UI of the OS), or the like. In some examples, the media application 402 may include a media window 404 that may be configured to provide application-specific content of the media application 402. Additionally, the device 100 may also be configured to identify, process, and/or respond to one or more gestures. For example, in another non-limiting example, a user 202 may draw a straight line from F1 to FN (otherwise known as a "swipe" gesture). In other examples, the "swipe" gesture may end before FN; however, the device 100 may still be able to identify the gesture. Using the media application 402 as an example, the forward swipe from F1 to FN may indicate to the OS 232 that the media application 402 should perform a skip track operation. As such, the OS 232 may provide information to the media application 402 that the user 202 has requested a track forward operation; thus, enabling the media application 402 to perform the skip forward operation. While the swipe gesture is illustrated here being performed at the lower portion of the display 102, the gesture may be performed and/or configured to be performed anywhere on the display 102 and/or in any direction, as desired.

Figure 5:
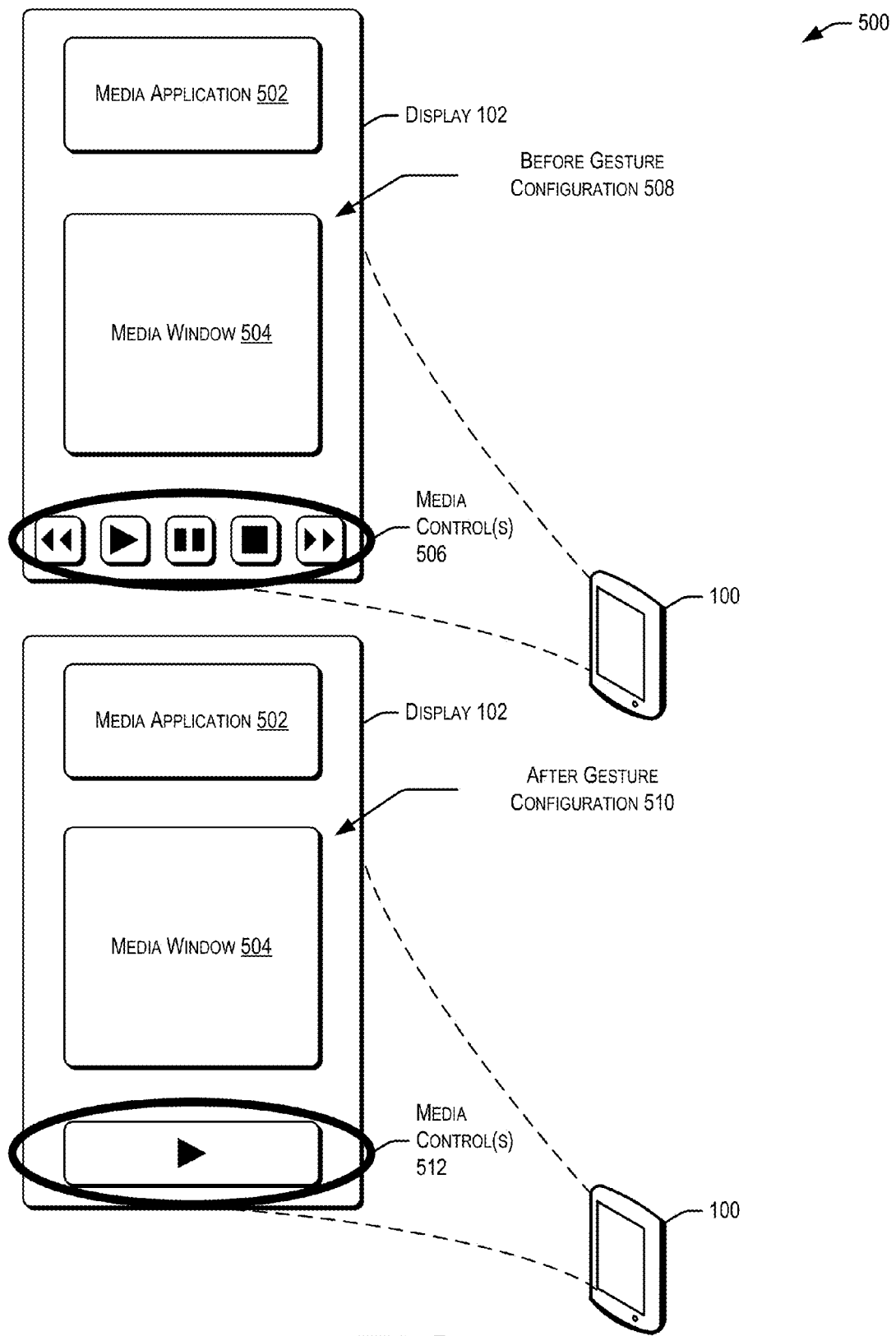
FIG. 5 illustrates another example block diagram for describing the management of screen input information described herein, according to at least one example.

FIG. 5 depicts an example block diagram 500 for describing additional techniques and/or features for managing screen input information, as described herein. In this non-limiting example, details of how screen real estate may be saved or otherwise recovered by utilizing the configurable gesture techniques described herein. For example, the device 100 may be configured, in some aspects, to provide a media application 502 (much like the media application 402). In this example, the media application 502 may include a media window 504 (e.g., for displaying content of the media application 502) and one or more media controls 506. Additionally, in some examples, the media controls 506 may be provided before gesture confirmation 508. Further, in some examples, a user may configure one or more gestures such that some of the media controls 506 are no longer needed on the display 102. For example, a set of gestures may be defined or otherwise configured to provide each of "rewind," "pause," "stop," and "fast forward" operations, respectively. As such, providing all of the media controls 506 within the media application 502 may be redundant as these operations can now be performed using the defined and/or configured gestures. As such, in some examples, after gesture configuration 510, the media controls 512 of the media application 502 may only include the "play" button because a gesture was not configured for play. Additionally, in some examples, the modification of the media application 502 UI may be performed automatically based at least in part on the configuration of the gestures and/or may be hard-coded by the application developers such that certain UI elements will disappear and some will remain upon configuration.

Figure 6:
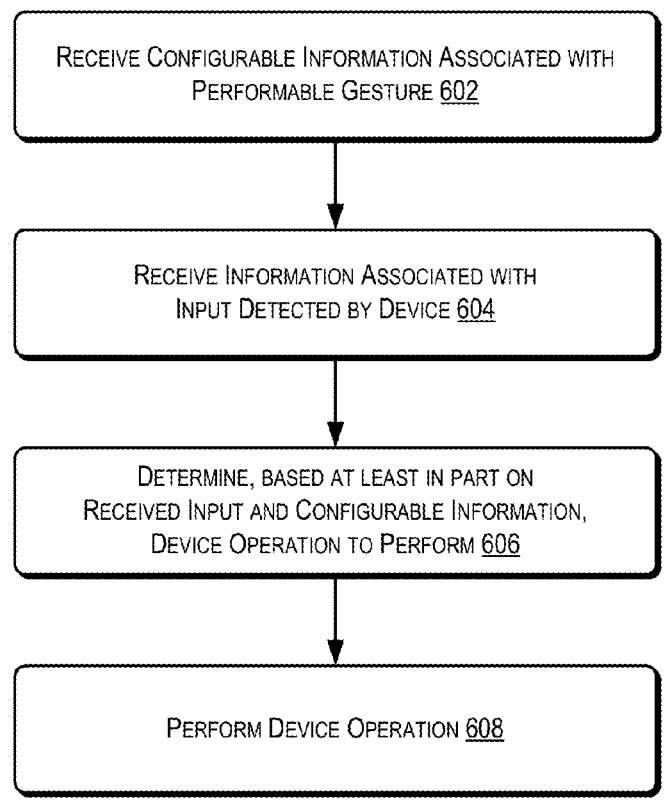
FIG. 6 illustrates an example flow diagram of a process for describing implementation of the management of screen input information described herein, according to at least one example.
Figure 7:
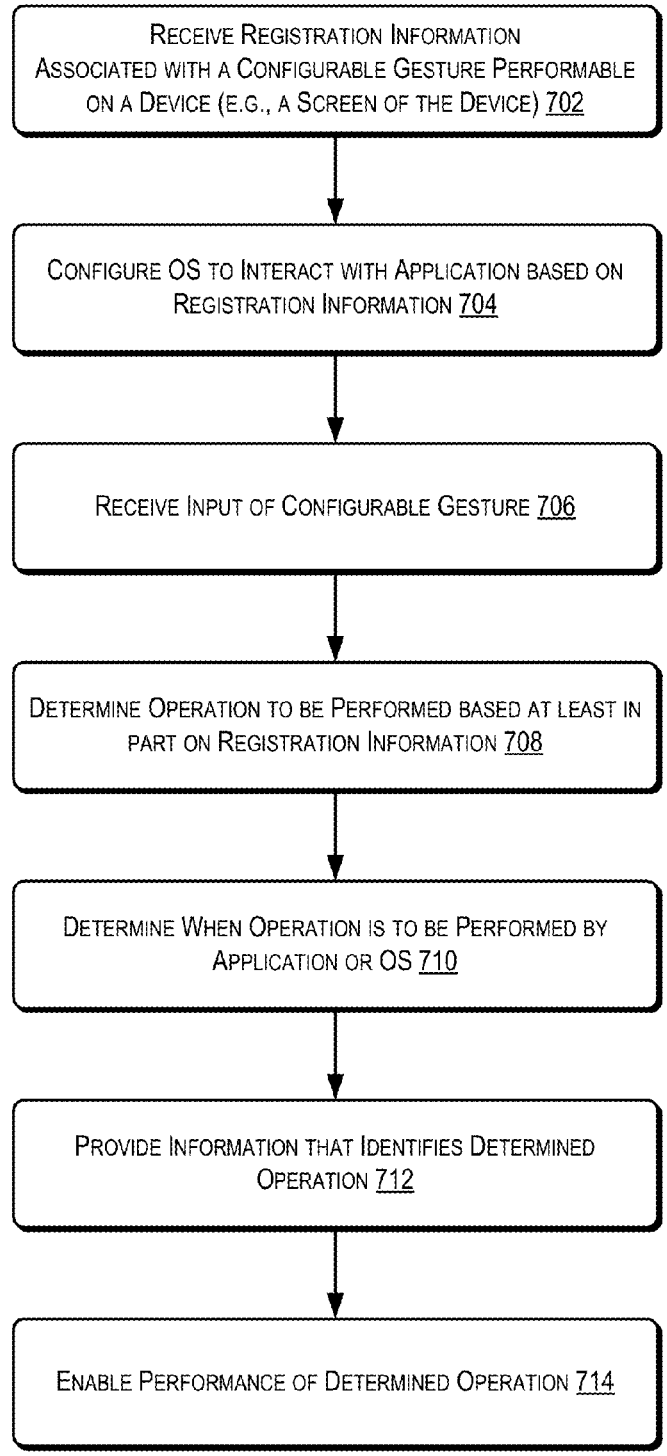
FIG. 7 illustrates an example flow diagram of a process for describing implementation of the management of screen input information described herein, according to at least one example.
Figure 8:
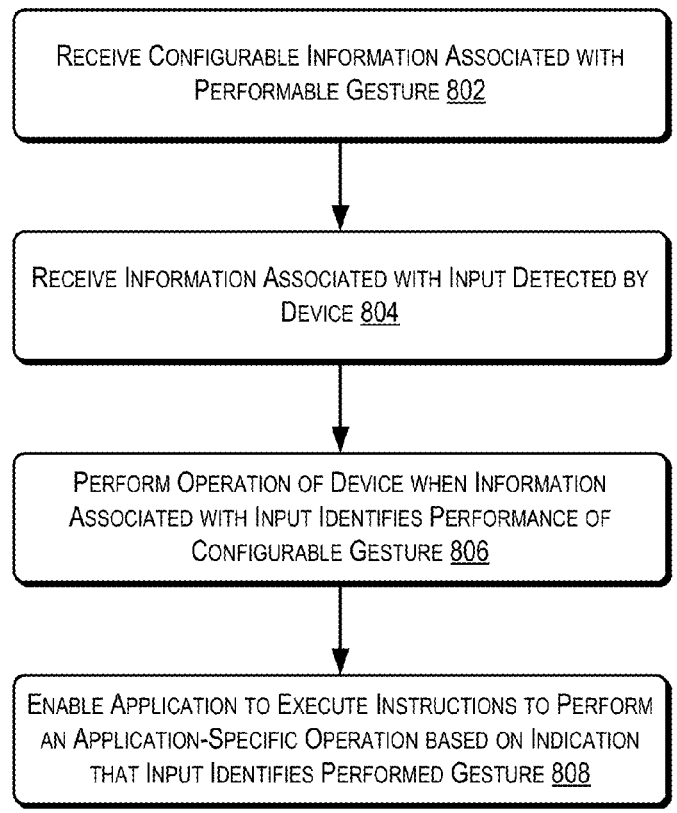
FIG. 8 illustrates an example flow diagram of a process for describing implementation of the management of screen input information described herein, according to at least one example.

FIGS. 6-8 illustrate example flow diagrams showing respective processes 600, 700, 800 for providing screen input information management, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more screen input information management devices 100 (e.g., utilizing at least one of a handler of the OS 232, the gesture management module 234, the gesture configuration module 236, and/or the gesture registration module 238) shown in FIG. 2 may perform the process 600 of FIG. 6. The process 600 may begin at 602 by including receipt of configurable information associated with a performable gesture. In some examples, the configurable information may be configuration information that may be modified by a user or other entity. The configurable information may be received by a handler of an OS and may be received from either a user or an application. Additionally, the configurable information may enable changes to be made to gesture definitions and/or gesture-operation associations. In some examples, at 604, the process 600 may also include receiving information associated with input detected by the device. This information may identify a gesture that was performed by a user on the screen. Additionally, the process 600 may include determining a device operation to perform at 606. The device operation may be an OS instruction to perform (e.g., launch an application or the like) or it may be an instruction to provide information to an application (e.g., when an application-specific operation is to be performed). Additionally, the determination may be based at least in part on the received input and/or the configuration information. In some examples, the process 600 may end at 608 where the process may include performing the device operation.

FIG. 7 illustrates an example flow diagram showing process 700 for providing screen input information management, according to at least a few examples. The one or more screen input information management devices 100 (e.g., utilizing at least one of a handler of the OS 232, the gesture management module 234, the gesture configuration module 236, and/or the gesture registration module 238) shown in FIG. 2 may perform the process 700 of FIG. 7. The process 700 may begin at 702 by including receipt of registration information associated with a configurable gesture performable on a device (e.g., on a screen of the device). In some examples, the registration information may include configuration settings as well as registry information generally provided when an application is installed. The registration information may also include specific gesture information that may identify what gestures the application may expect and/or what gestures the application is configured to handle. At 704, the process 700 may include configuring the OS (or a handler of the OS) to interact with the application (e.g., the application that provided the registration information) based at least in part on the registration information. The configuration may include updating or otherwise modifying the registry of the device.

In some examples, the process 700 may also include receiving input of a configurable gesture at 706. The input may identify the configurable gesture that was performed as well as other related information including, but not limited to, speed of the gesture, location of the gesture, size of the gesture, etc. This information may be included in making a determination as to what operations to perform (e.g., similar gestures performed at different speeds or on different locations of the device may activate different operations). At 708, the process 700 may include determining an operation to be performed based at least in part on the registration information and/or the received input (e.g., the gesture information). At 710, the process 700 may include determining when the operation is to be performed by the application or the OS. For example, and as noted above, some operations are global while others are application-specific. As such, if the operation is global, the process 700 may determine that the OS should perform the operation. Alternatively, if the operation is application-specific, the process 700 may determine that the application should perform the operation. At 712, the process 700 may also include providing the information that identifies the determined operation. As noted above, this information may be provided to either the application or the OS (e.g., from the handler). The determination of which entity is to receive the information may be based at least in part on the determination of which entity is to perform the operation. Further, in some examples, the process 700 may end at 714 where the process 700 may include enabling performance of the determined operation. This may entail performing the operation (e.g., by the OS) or making it possible for the application to perform the operation.

FIG. 8 illustrates an example flow diagram showing process 800 for providing screen input information management, according to at least a few examples. The one or more screen input information management devices 100 (e.g., utilizing at least one of a handler of the OS 232, the gesture management module 234, the gesture configuration module 236, and/or the gesture registration module 238) shown in FIG. 2 may perform the process 800 of FIG. 8. The process 800 may begin at 802 by including receipt of configuration information associated with a performable gesture. At 804, the process 800 may also include receiving information associated with input detected by the device. The input may include an indication of a gesture that was performed on the device (e.g., by a user). Additionally, in some examples, the process 800 may include performing an operation of the device when information associated with the input identifies a gesture at 806. In some examples, a determination of whether the input identifies a gesture may be based at least in part on whether the gesture has been registered, defined, and/or configured with the device and/or an OS handler of the device. Further, the process 800 may end at 808 where the process 800 may include enabling an application to execute instructions to perform an application-specific operation based at least in part on an indication that the received input identifies a performed gesture.

Illustrative methods and systems for managing screen input information are described above. Some or all of these systems and methods may, but need not, be implemented at least partially by architectures such as those shown at least in FIGS. 1-8 above.

Figure 9:
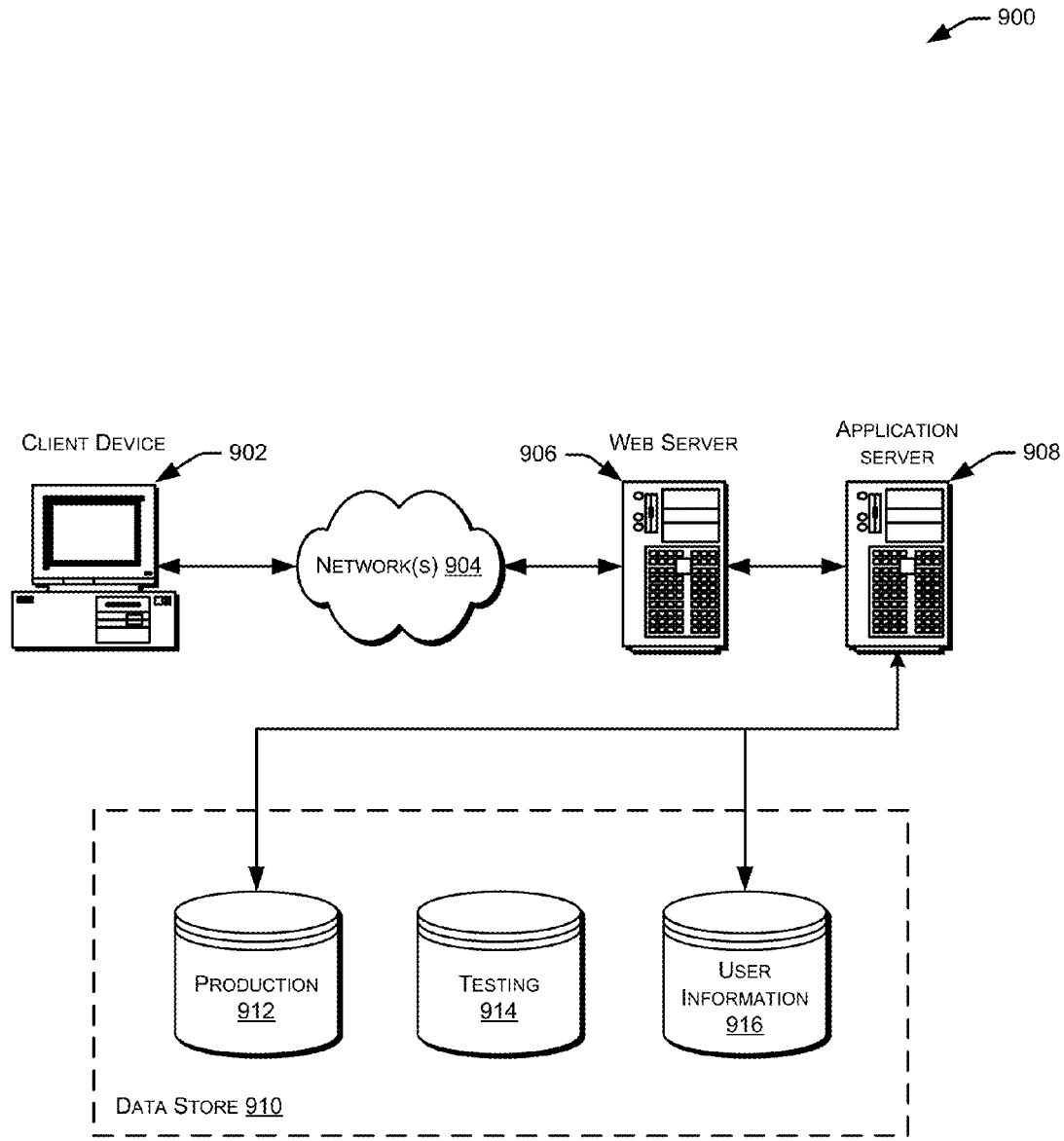
FIG. 9 illustrates an environment in which various embodiments of the management of screen input information described herein can be implemented, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing screen input information, comprising:
   receiving, at one or more computer systems, from an application associated with a device, registration information associated with a configurable gesture performable on a screen of the device, the configurable gesture comprising a blank gesture that is to be configured;
   configuring an operating system service to interact with the application based at least in part on the registration information;
   receiving, by the operating system service, input associated with the configurable gesture at least in response to the configurable gesture being performed on the screen;
   determining an operation to be performed that corresponds to the configurable gesture based at least in part on at least one of the registration information or the received input;
   providing implementation information that identifies the determined operation; and
   enabling performance, by the operating system service or the application, of the determined operation based at least in part on the provided implementation information.

2. The computer-implemented method of claim 1, wherein the operating system service is configured as an interrupt handler.

3. The computer-implemented method of claim 2, wherein the registration information identifies at least one of the configurable gesture or the operation to be performed.

4. The computer-implemented method of claim 1, further comprising determining when the operation is to be performed by an operating system that executes the operating system service or by the application, and wherein the implementation information that identifies the determined operation is provided to the application when the operation is determined to be performed by the application, and wherein the determined operation is executed by the operating system when the operation is determined to be performed by the operating system.

5. The computer-implemented method of claim 1, wherein configuring the operating system service includes at least updating a registry file associated with the application to at least include the registration information.

6. A computer-implemented method for managing screen input information, comprising:
   receiving, at one or more computer systems, by an operating system service of a device, configurable information associated with a performable gesture, the configurable information identifying an operation of the device that is to be associated with the performable gesture, the performable gesture comprising a blank gesture that is to be configured;
   receiving, by the operating system service, information associated with input detected by the device; and
   performing the operation of the device when the information associated with the input identifies performance of the performable gesture.

7. The computer-implemented method of claim 6, wherein the operating system service includes an interrupt handler.

8. The computer-implemented method of claim 6, wherein the configurable information is received from a user of the device.

9. The computer-implemented method of claim 8, wherein the input detected by the device is based at least in part on a performed gesture, the performed gesture defined by the user's performance of the performable gesture.

10. The computer-implemented method of claim 6, wherein the configurable information is received from an application executed by the device.

11. The computer-implemented method of claim 10, wherein performing the operation includes providing an indication to the application that the input detected by the device identifies a performed gesture, the performed gesture defined by the user's performance of the performable gesture.

12. The computer-implemented method of claim 11, further comprising enabling the application to execute an instruction to perform an application-specific operation based at least in part on the indication that the input detected by the device identifies the performed gesture.

13. The computer-implemented method of claim 12, wherein the application-specific operation includes at least one of play, pause, stop, record, or change to a different section of a media file.

14. The computer-implemented method of claim 12, wherein the application-specific operation is configurable by a user of the device to be associated with the performable gesture.

15. The computer-implemented method of claim 6, wherein the operation of the device includes at least a global operation configurable by a user of the device to be associated with the performable gesture.

16. The computer-implemented method of claim 15, wherein the global operation includes at least one of opening a global help file of the device or launching an application of the device.

17. A system for managing screen input information, comprising:
   a memory that stores computer-executable instructions; and
   a processor configured to access the memory, wherein the processor is configured to execute the computer-executable instructions to collectively at least:
   receive, by an operating system service of a device configured with the system, configurable gesture information associated with a performable gesture, the performable gesture comprising a blank gesture that is to be configured;
   receive, from a user of the device, configuration information corresponding to the configurable gesture information, the configuration information containing an indication of an operation of the device that is to be associated with the performable gesture;
   configure the operating system service based at least in part on the received configuration information;
   receive input to the device; and
   perform the operation of the device when the received input indicates that the performable gesture was performed.

18. The system of claim 17, wherein the performable gesture is detectable by the screen of the device.

19. The system of claim 17, wherein the configurable gesture information is received from an application.

20. The system of claim 17, wherein the configuration information modifies the configurable gesture information.

21. The system of claim 17, wherein the configuration information indicates an acceptance of default gesture information by the user.

22. One or more computer-readable media storing computer-executable instructions for managing screen input information that, when executed by one or more computer systems, configure the one or more computer systems to perform operations comprising:
- receive, by an operating system service of a device configured with the system, configurable gesture information associated with a performable gesture, the performable gesture comprising a blank gesture that is to be configured;
- receiving information associated with input detected by the device;
- determining, based at least in part on the received input and the configurable information, a device operation to perform; and
- performing the device operation based at least in part on the determination of the device operation to be performed.

23. The one or more computer-readable media of claim 22, wherein the configurable information indicates an association between the performable gesture and the operation to be performed.

24. The one or more computer-readable media of claim 22, wherein the device operation to be performed includes at least launching an application of the device, opening a document of the device, or establishing a connection between the device and another computing system.

25. The one or more computer-readable media of claim 24, wherein the document includes a help document.

26. The one or more computer-readable media of claim 22, wherein the device operation to be performed includes at least providing an application-specific instruction to an application of the device.

* * * * *